United States Patent
Shinohara et al.

(10) Patent No.: US 6,257,109 B1
(45) Date of Patent: Jul. 10, 2001

(54) AUTOMATIC LATHE AND METHOD OF CONTROLLING SAME

(75) Inventors: Hiroshi Shinohara, Kawagoe; Takaichi Nakaya, Higashimurayama, both of (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/486,378

(22) PCT Filed: Aug. 29, 1997

(86) PCT No.: PCT/JP97/03028

§ 371 Date: Feb. 28, 2000

§ 102(e) Date: Feb. 28, 2000

(87) PCT Pub. No.: WO99/11408

PCT Pub. Date: Mar. 11, 1999

(51) Int. Cl.[7] .................................................. B23B 1/00
(52) U.S. Cl. ............................ 82/1.11; 82/118; 82/120; 82/121
(58) Field of Search ............................ 82/120, 121, 1.11, 82/118, 117, 133, 134, 159; 29/26 A, 568; 364/474.21, 474.26

(56) References Cited

U.S. PATENT DOCUMENTS

| | | | |
|---|---|---|---|
| 3,760,472 | * 9/1973 | Kielma et al. | 29/40 |
| 4,074,177 | * 2/1978 | Olig | 29/26 A |
| 4,090,281 | * 5/1978 | Hautau | 29/40 |
| 4,180,894 | 1/1980 | Link | 29/36 |
| 4,309,809 | * 1/1982 | Yokoe et al. | 29/568 |
| 4,413,539 | * 11/1983 | Ishizuka et al. | 82/2 R |
| 4,621,407 | * 11/1986 | Suzuki | 29/568 |
| 4,649,610 | * 3/1987 | Onishi et al. | 29/26 A |
| 4,709,455 | * 12/1987 | D'Andrea et al. | 29/26 A |
| 5,007,314 | 4/1991 | Hafla et al. | 82/120 |
| 5,084,951 | * 2/1992 | Bonomi et al. | 29/26 A |
| 5,097,587 | 3/1992 | Yasuda | 29/568 |
| 5,514,061 | * 5/1996 | Ito | 29/26 A |
| 5,842,392 | * 12/1998 | Pfeifer et al. | 82/1.11 |

FOREIGN PATENT DOCUMENTS

| | | |
|---|---|---|
| 0 059 494 | 2/1982 | (EP) . |
| 0 598 386 A2 | 11/1993 | (EP) . |
| 1 411 705 | 10/1975 | (GB) . |
| 2-284847 | 11/1990 | (JP) . |
| 3-19747 | 1/1991 | (JP) . |
| 3-136745 | 6/1991 | (JP) . |
| 7-39069 | 5/1995 | (JP) . |

* cited by examiner

Primary Examiner—Henry Tsai
(74) Attorney, Agent, or Firm—Armstrong Westerman Hattori McLeland & Naughton, LLP

(57) ABSTRACT

A turret (11) is clamped to a tool rest main body (10) by a pair of coupling members (27). During indexing rotation for selecting a tool, the tool rest main body (10) and the turret (11) are moved relatively in a Z-axis direction, and the pair of coupling members (27) are unclamped. At this time, the tool rest main body (10) is moved in the Z-axis direction relative to a lathe main body (100) in synchronism with the relative movement in the Z-axis direction between the tool rest main body (10) and the turret (11). This movement of the tool rest main body (10) is adjusted in direction and moving distance so that the relative movement between the turret (11) and a spindle table (1) is eliminated. As a result of this movement control, the turret (11) and the tool fitted to the former do not have relative displacement to the spindle table (1) and to a work, so that the danger of mutual interference among these constituent elements and the work can be eliminated.

6 Claims, 9 Drawing Sheets

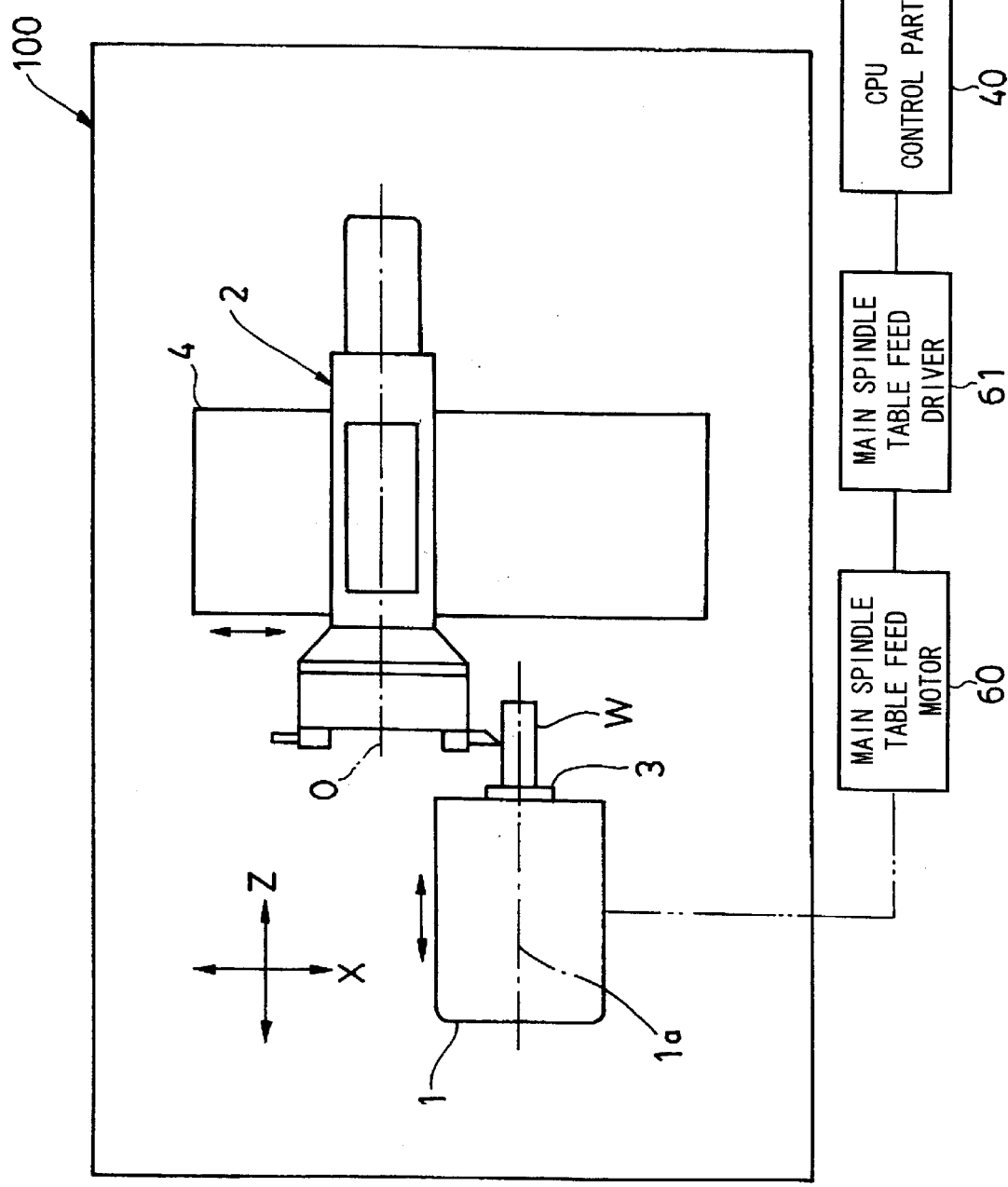

AUTOMATIC LATHE AND METHOD OF CONTROLLING SAME

TECHNICAL FIELD

The present invention relates to an automatic lathe provided with a turret device that can be fitted with a plurality of tools and select tools optionally through indexing rotations.

BACKGROUND TECHNOLOGY

There has recently been an increasing demand for automatic lathes provided with a turret device that can be fitted with a plurality of tools so as to cope with a need for adopting to a large variety and small quantity manufacturing system while effecting automation as well as speedup of machining operation.

The turret device is structured such that a turret mounted on a tool rest main body is capable of executing indexing rotations so as to present any of normally 5 to 12 indexing positions optionally. Tool mounting portions are formed on a peripheral face or an outer end face of the turret, and various tools such as a turning tool, a drill, and so forth can be mounted on the respective tool mounting portions, enabling automatic selection of suitable tools according to the content of a machining operation through indexing rotations of the turret.

A pair of coupling members capable of engaging with each other and disengaging from each other (clamping/unclamping) are provided between the tool rest main body and the turret, and the turret can be rendered freely rotatable or fixedly held for positioning in a given indexing position by engaging the pair of the coupling members with each other or disengaging the same from each other.

For the coupling members described above, coupling members in the form of crown gears of a curvic coupling or the like for being meshed with each other are generally adopted.

With this type of the coupling members, engagement and disengagement thereof are normally effected by moving a coupling member disposed on the turret side in the axial direction relative to a coupling member disposed on the side of the tool rest main body. More specifically, for effecting the indexing rotation of the turret, engagement between the respective coupling members is released by moving the turret in the axial direction relative to the tool rest main body, and while the respective coupling members are kept in this state, the indexing rotation of the turret is executed.

The indexing rotation of the turret is executed subsequently to completion of a machining operation with the use of a certain tool. Accordingly, a workpiece and a main spindle table for supporting the workpiece are present in the vicinity of the turret at the time of the indexing rotation.

Hence, if the indexing rotation of the turret is executed with the turret kept in a position where it is present upon completion of the machining operation, this involves a risk of the turret and a tool fitted to the turret coming to interfere with the main spindle table and the workpiece as a result of a movement of the turret in the axial direction.

Accordingly, it has been conventionally necessary to carry out programming for a machining operation such that the indexing rotation of the turret is executed after the turret device is moved to a position where such interference can be avoided.

Such programming for a machining operation needs to be carried out by a user himself according to the content of the machining operation. A machining program to be inputted in an automatic lathe is generally developed by a user while referring to a design drawing of a product.

However, the movement of the turret in the axial direction accompanying the indexing rotation thereof can not be known from the design drawing of the product, because the movement is a motion depending on a structure of the automatic lathe. Accordingly, it has been troublesome for the user to develop a machining program always taking into account a distance of the movement. Furthermore, there has been a risk of the user's making a mistake of developing a machining program without taking into account the movement of the turret in the axial direction associated with the indexing rotation. In case of such a mistake being made, there is a possibility of the turret and tools coming to interfere with the main spindle table and the workpiece, thereby destroying the latter.

In addition, if the turret device is caused to make an evacuating motion every time when the indexing rotation of the turret is executed, this will result in a longer machining time by at least the length of time taken for making the motion.

In the light of such circumstances as described, the present invention has been developed, and an object of the invention is to prevent the turret and a tool fitted thereto from interfering with the main spindle table and the work, and to shorten machining time by eliminating the movement of the turret relative to a lathe main body on which the main spindle table is mounted during the indexing rotations of the turret while simplifying programming by the user for a machining operation.

DISCLOSURE OF THE INVENTION

To this above described end, the automatic lathe according to the invention comprises the following:

(1) a lathe main body with a main spindle table mounted thereon;

(2) a tool rest main body freely movable on the lathe main body at least in a z-axis direction parallel with a main spindle axis;

(3) a turret mounted on the tool rest main body, and capable of relatively moving in the z-axis direction against the tool rest main body and indexing around a rotary center parallel to the z-axis;

(4) a pair of coupling members installed on the tool rest main body and the turret, respectively, and capable of engaging with and disengaging from each other as a result of a relative movement in the z-axis direction taking place between the tool rest main body and the turret; and (5) control means for eliminating a relative movement between the turret and the main spindle table by moving the tool rest main body in the z-axis direction relative to the lathe main body, in synchronization with the relative movement in the z-axis direction taking place between the tool rest main body and the turret.

In this connection, the main spindle table is a constituent element for holding and rotating the workpiece. The axis of rotation for the workpiece supported by the main spindle table is called a main spindle axis, and the tool rest main body is structured so as to be freely movable at least in the z-axis direction parallel with the main spindle axis.

A plurality of tools are optionally mountable on the turret, and tools as required can be automatically selected by the indexing rotation of the turret. And through a relative movement between the main spindle table and the tool rest main body, the workpiece supported by the main spindle table is machined into a required shape.

The turret is clamped to the tool rest main body by the pair of the coupling members. During the indexing rotation for selecting a tool, the pair of coupling members are unclamped by relatively moving the tool rest main body against the turret in the z-axis direction, so that the turret is rendered freely indexable.

Hereupon, the control means causes the tool rest main body to move in the z-axis direction relative to the lathe main body, in synchronization with the relative movement in the z-axis direction taking place between the tool rest main body and the turret. The movement of the tool rest main body is adjusted in respect of direction and moving distance such that the relative movement between the turret and the main spindle table is eliminated.

As a result of such control of movement as described, there will occur no relative displacement of the turret and a tool fitted thereto against the main spindle table and a work, thereby eliminating a risk of mutual interference taking place among these constituent elements including the work.

At the time of the indexing rotation of the turret, the relative displacement between the workpiece supported by the main spindle table and the tool fitted to the turret is thus eliminated, so programming for machining may be carried out by a user on the basis of a position of the workpiece relative to the tool at the time of completion of a machining operation. Accordingly, there will be no need to take into account the relative displacement between the workpiece and the turret, accompanying the indexing rotation of the turret, as with the conventional case, thereby facilitating operation.

Further, since there will be no need of evacuating the turret device prior to the indexing rotation of the turret, machining time can be shortened by at least a length of time saved due to omission of such a motion.

Also, if a main spindle table is movable on a lathe main body at least in a z-axis direction parallel with a main spindle axis, the invention may have such a configuration that control means is able to eliminate a relative movement between a turret and the main spindle table by moving the main spindle table in the z-axis direction relative to the lathe main body, in synchronization with a movement of the turret in the z-axis direction.

The movement of the main spindle table in this case is adjusted in respect of direction and moving distance in such a way as to eliminate the relative movement between the turret and the main spindle table.

The present invention may also be applicable to an automatic lathe comprising a tool rest main body that is freely movable on a lathe main body at least in an x-axis direction orthogonal to a main spindle axis, and a pair of coupling members capable of engaging with and disengaging from each other as a result of a relative movement in the x-axis direction taking place between the tool rest main body and a turret.

In this case, the invention comprises control means for eliminating a relative movement between the turret and a main spindle table by moving the tool rest main body in the x-axis direction relative to the lathe main body, in synchronization with the relative movement in the x-axis direction taking place between the tool rest main body and the turret.

The movement of the tool rest main body in this case is adjusted in respect of direction and moving distance in such a way as to eliminate the relative movement between the turret and the main spindle table.

Further, the present invention can be embodied by a method of controlling an automatic lathe comprising a lathe main body with a main spindle table mounted thereon, a tool rest main body freely movable on the lathe main body at least in a z-axis direction parallel with a main spindle axis, a turret mounted on the tool rest main body and capable of relatively moving in the z-axis direction against the tool rest main body and indexing around a rotary center parallel to the z-axis, and a pair of coupling members installed on the tool rest main body and the turret, respectively, and capable of engaging with and disengaging from each other as a result of a relative movement in the z-axis direction taking place between the tool rest main body and the turret.

That is, with the method of controlling the automatic lathe according to the invention, a relative movement between the turret and the main spindle table is eliminated by moving the tool rest main body in the z-axis direction relative to the lathe main body, in synchronization with the relative movement in the z-axis direction taking place between the tool rest main body and the turret.

The movement of the tool rest main body in this case is adjusted in respect of direction and moving distance in such a way as to eliminate the relative movement between the turret and the main spindle table.

Similarly, the present invention can also be embodied by a method of controlling an automatic lathe comprising a lathe main body with a tool rest main body mounted thereon, a main spindle table movable on the lathe main body at least in a z-axis direction parallel with a main spindle axis, a turret mounted on the tool rest main body so that the turret can freely move in the z-axis direction and freely index around a rotary center parallel to the z-axis, and a pair of coupling members installed on the tool rest main body and the turret, respectively, and capable of engaging with and disengaging from each other as a result of a movement of the turret in the z-axis direction.

That is, with this method, control is effected such that a relative movement between the turret and the main spindle table is eliminated by moving the main spindle table in the z-axis direction relative to the lathe main body, in synchronization with the movement of the turret in the z-axis direction.

The movement of the main spindle table in this case as well is adjusted in respect of direction and moving distance in such a way as to eliminate the relative movement between the turret and the main spindle table.

Furthermore, the present invention can also be embodied by a method of controlling an automatic lathe comprising a lathe main body with a main spindle table mounted thereon, a tool rest main body freely movable on the lathe main body at least in a x-axis direction orthogonal to a main spindle axis, a turret mounted on the tool rest main body and capable of relatively moving in the x-axis direction against the tool rest main body and indexing around a predetermined rotary center, and a pair of coupling members installed on the tool rest main body and the turret, respectively, and capable of engaging with and disengaging from each other as a result of a relative movement in the x-axis direction taking place between the tool rest main body and the turret.

That is, with this method, control is effected such that a relative movement between the turret and the main spindle table is eliminated by moving the tool rest main body in the x-axis direction relative to the lathe main body, in synchronization with the relative movement in the x-axis direction taking place between the tool rest main body and the turret.

The movement of the main spindle table in this case as well is adjusted in respect of direction and moving distance in such a way as to eliminate the relative movement between the turret and the main spindle table.

With respective configurations described in the foregoing, there will occur no relative displacement of the turret and a tool fitted thereto, against the main spindle table and a work, so that a risk of mutual interference occurring among those constituent elements including the work is eliminated.

In addition, since at the time of the indexing rotation of the turret, the relative displacement between the workpiece supported by the main spindle table and the tool fitted to the turret is eliminated, programming for machining may be carried out by a user on the basis of a position of the workpiece relative to the tool upon completion of a machining operation. Accordingly, there will be no need of taking into account the relative displacement between the workpiece and the turret, accompanying the indexing rotation of the turret, as with the conventional case, thereby facilitating operation.

Furthermore, since there will be no need of evacuating the turret device prior to the indexing rotation of the turret, machining time can be shortened by at least a length of time saved due to omission of such a motion.

BRIEF DESCRIPTION OF DRAWINGS

FIG. 8 is a plan view showing an external configuration of an automatic lathe having another construction to which the invention is applied.

BEST MODE FOR CARRYING OUT THE INVENTION

Embodiments of the present invention will be described in detail hereinafter with reference to the accompanying drawings.

Figure 1:
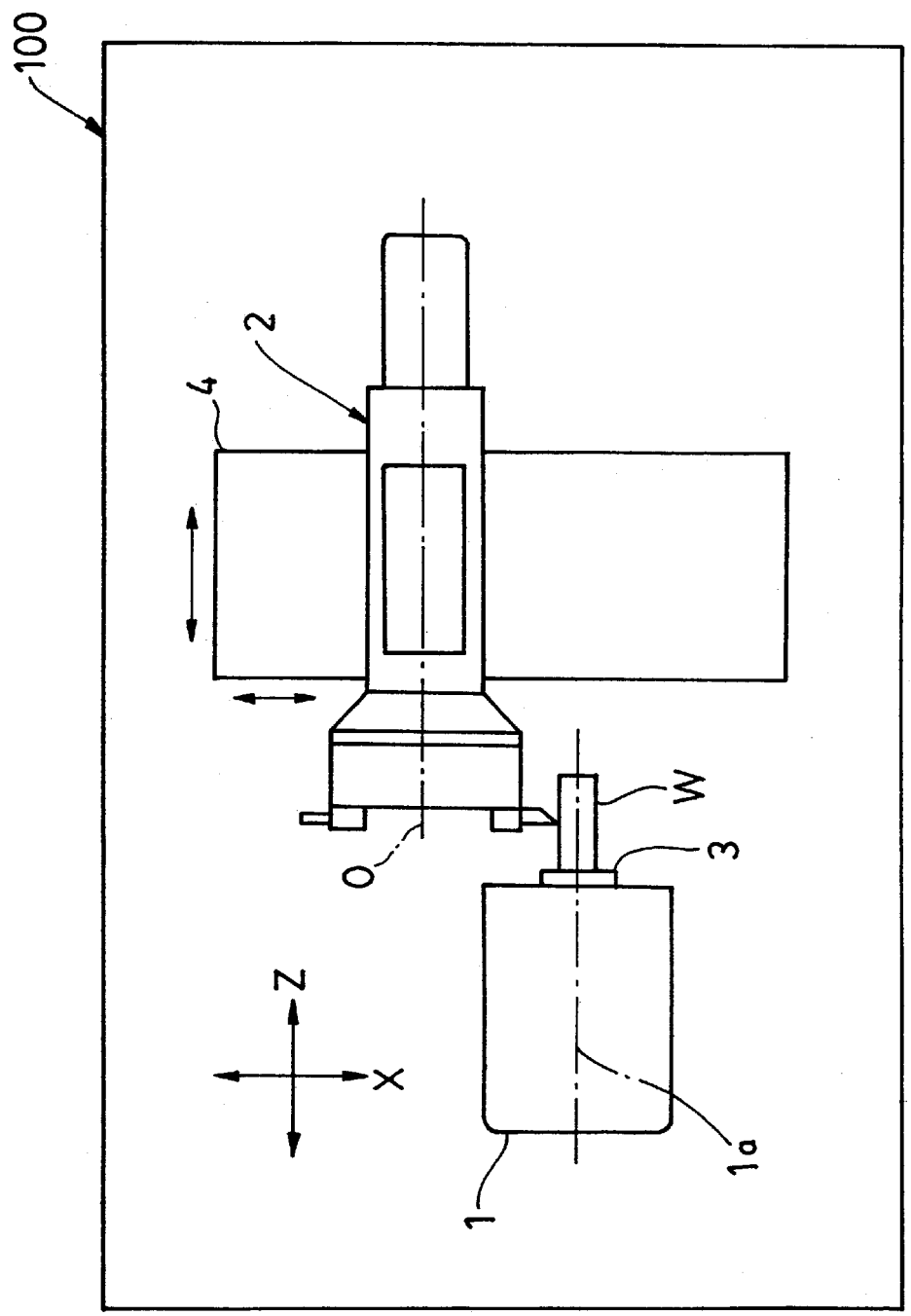
FIG. 1 is a plan view showing an external configuration of an automatic lathe to which the invention is applied.

FIG. 1 is a plan view showing an external configuration of an automatic lathe to which the present invention is applied. As shown in the figure, the automatic lathe is equipped with a main spindle table 1 and a turret device 2 mounted on a lathe main body 100.

The main spindle table 1 is provided with a chuck 3 for clamping a workpiece W, and the workpiece W is clamped by the chuck 3. And the main spindle table 1 has a function of rotating the workpiece W around a main spindle axis 1a by means of a main spindle motor (not shown) incorporated therein.

The turret device 2 is mounted on a tool slide 4. The tool slide 4 is capable of moving the turret device 2 in a z-axis direction parallel with the main spindle axis 1a as well as in a x-axis direction orthogonal to the main spindle axis 1a by a driving device which is not shown here. The turret device 2 is moved in the z-axis direction as well as in the x-axis direction together with the tool slide 4, thereby cutting the workpiece W.

Figure 2:
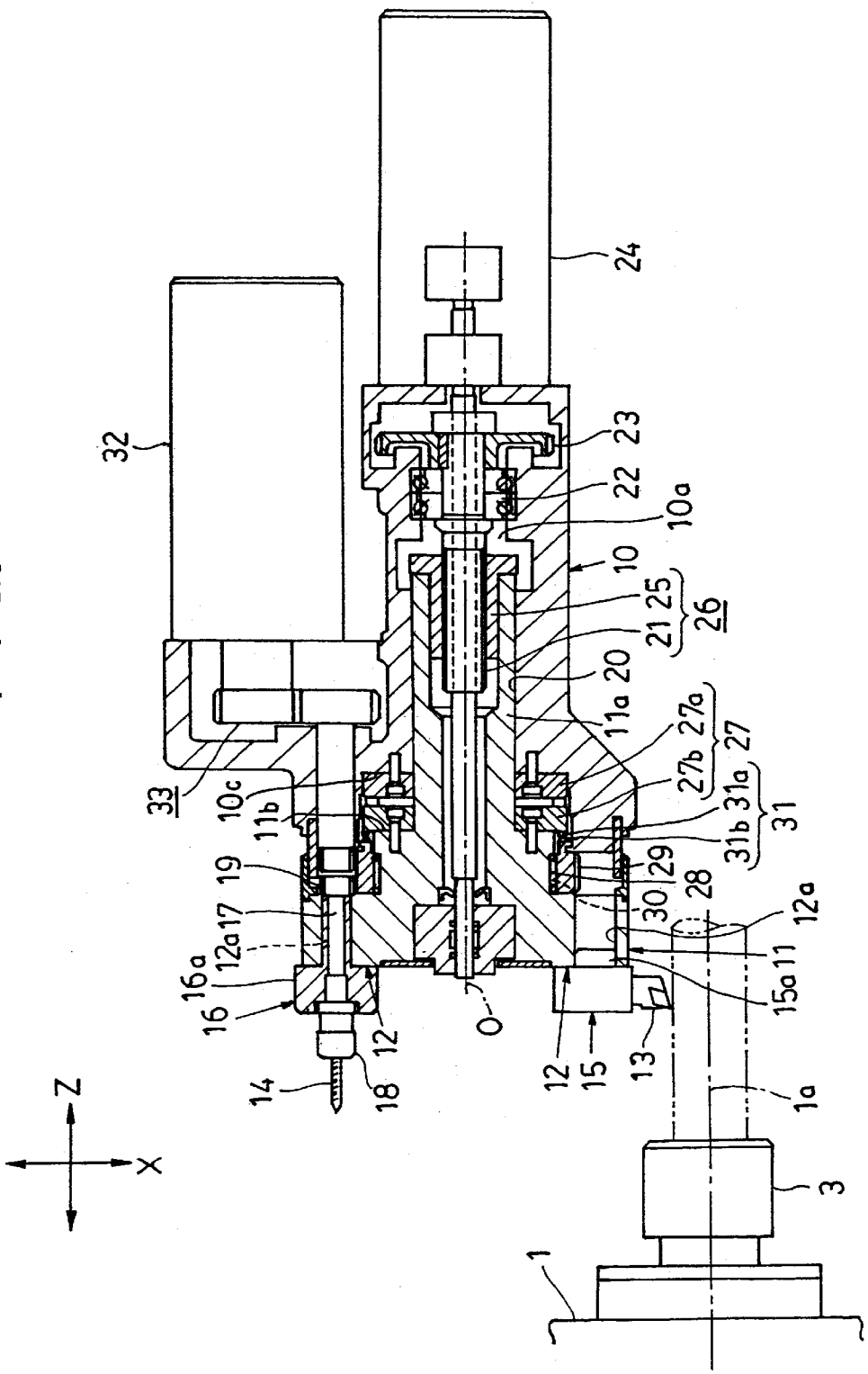
FIG. 2 is a sectional plan view showing a turret device.

FIG. 2 is a sectional plan view showing the turret device 2.

The turret device 2 is provided with a tool rest main body 10 mounted on the tool slide 4 and a turret 11 rotatably installed on the tool rest main body 10.

The turret 11 is provided with a plurality of tool mounting portions 12 installed with given indexing angles on the outer periphery of the front end thereof. A cutting tool 13 such as a turning tool or the like, fitted to a tool holder 15, and a rotary tool 14 such as a drill or the like, fitted to another tool holder 16, are mountable on the tool mounting portions 12, along with the tool holders 15, 16, respectively.

The tool holder 15 for the cutting tool 13 is fixed by inserting a protrusion 15a formed on the tool holder 15 into a mounting hole 12a formed in one of the tool mounting portions 12, and the tool holder 15 is then securely held by means of a fastening device (not shown) such as bolts and the like.

The tool holder 16 for the rotary tool 14 has a tool rotary shaft 17 penetrating through the center of a holder body 16a and rotatable, while a tool chuck 18 for clamping the rotary tool 14 is installed at the tip of the tool rotary shaft 17. Further, a tool rotary gear 19 is installed at the base end portion of the tool rotary shaft 17.

The tool holder 16 for the rotary tool 14 is securely held by means of a fastening device (not shown) such as bolts and the like by inserting the holder body 16a into a mounting hole 12a bored in one of the tool mounting portions 12 of the turret 11, whereupon the tool rotary gear 19 installed at the base end portion of the tool rotary shaft 17 is caused to penetrate through the turret 11 so as to be projected behind the same.

In this connection, the same as the well known configuration of a turret and mounted tools as applied to common machine tools may be adopted to a configuration of the tool mounting portions 12 and tools with respect to the turret 11, other than the configuration described above.

A base end portion 11a formed within a smaller diameter part of the turret 11 is fitted into the tool rest main body 10 in such a way as to be freely rotatable around the rotary center O as well as linearly movable along the rotary center O via a slide bearing 20 formed inside a hollow part 10a of the tool rest main body 10.

The rotary center O extends in the z-direction that is parallel to the main spindle axis 1a.

Further, inside the hollow part 10a of the tool rest main body 10, a ball screw 21 is installed coaxially with the rotary center O described above via rolling bearings 22. A motive transmission gear 23 is attached to the base end portion of the ball screw 21.

Meanwhile, a coupling motor 24 comprising a servomotor is mounted on the tool rest main body 10. A driving gear (not shown) meshing with the motive transmission gear 23 described above is attached to the rotary shaft of the coupling motor 24, so that rotary driving force of the coupling motor 24 is transmitted to the ball screw 21 via the driving gear and the motive transmission gear 23, thereby driving the ball screw 21 in rotation.

A nut 25 is screwed into the ball screw 21, and fixedly attached to the base end portion 11a of the turret 11. Accordingly, rotation of the ball screw 21 is accompanied by a linear movement of the nut 25 along the rotary center O, causing the turret 11 to move linearly along the rotary center O (that is, in the z-axis direction) fixedly together with the nut 25. Thus, a screw feed mechanism 26 for causing the turret 11 to move linearly is made up of the ball screw 21 and the nut 25.

Also, the turret 11 is fitted with an annular gear 29 installed coaxially with the rotary center O via needle bearings 28. The outer peripheral face of the annular gear 29 is provided with a gear formed so as to mesh with both the tool rotary gear 19 of the tool rotary shaft 17 and a gear for transmitting driving force of an indexing motor 32 as described later, while the inner peripheral face thereof is rotatably supported by the needle bearings 28.

The inner ring of the needle bearings 28 is formed as a recess 30 defined on the outer peripheral face of the turret 11, and is rotatable relative to the turret 11, but prevented from moving in the direction along the rotary center O, so the needle bearings 28 move together fixedly with the turret 11 in the same direction when the turret 11 makes a linear movement along the rotary center O.

Figure 3:
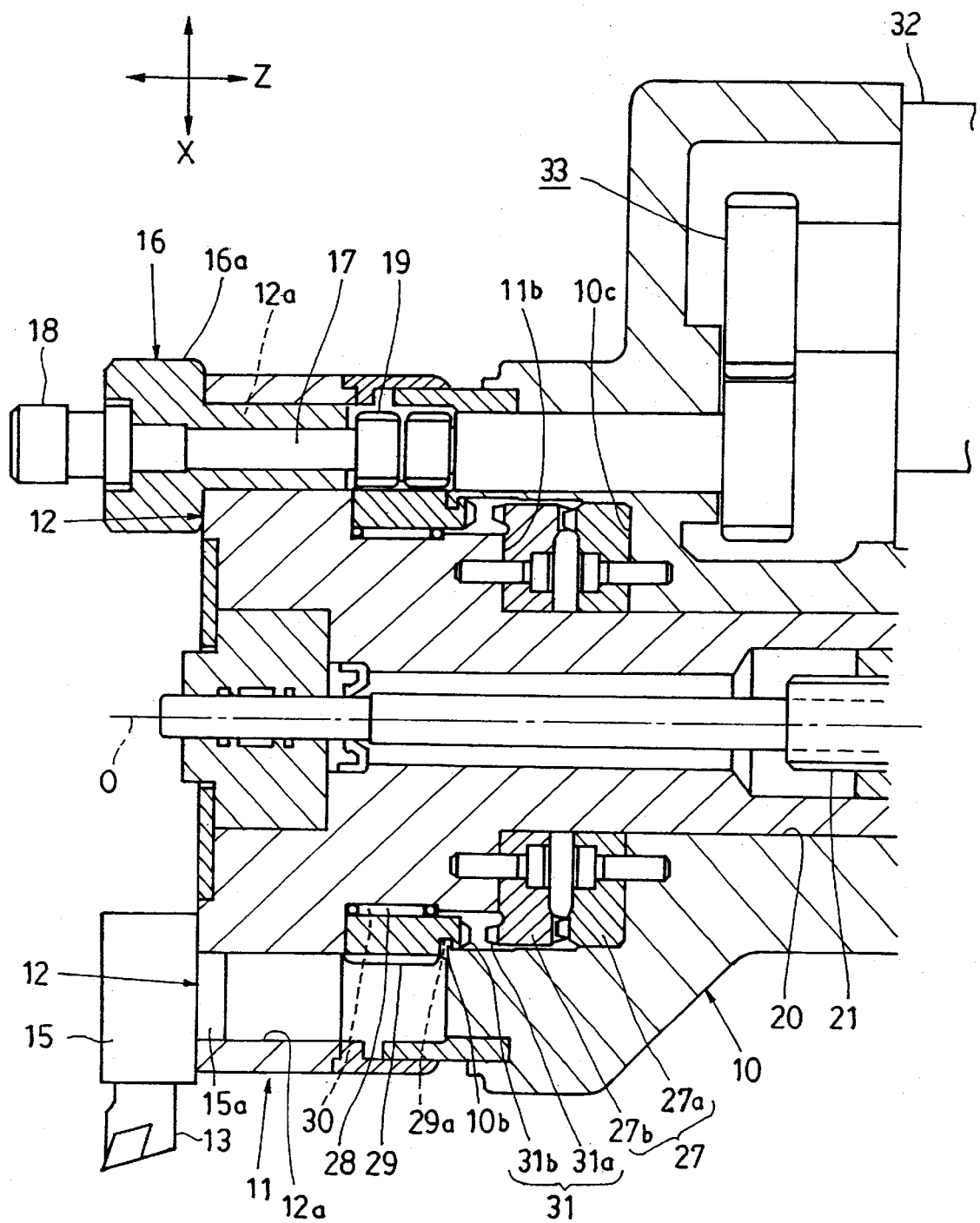
FIG. 3 is an enlarged sectional plan view showing a state wherein coupling members mesh with each other while the clutch pieces disengage from each other.
Figure 4:
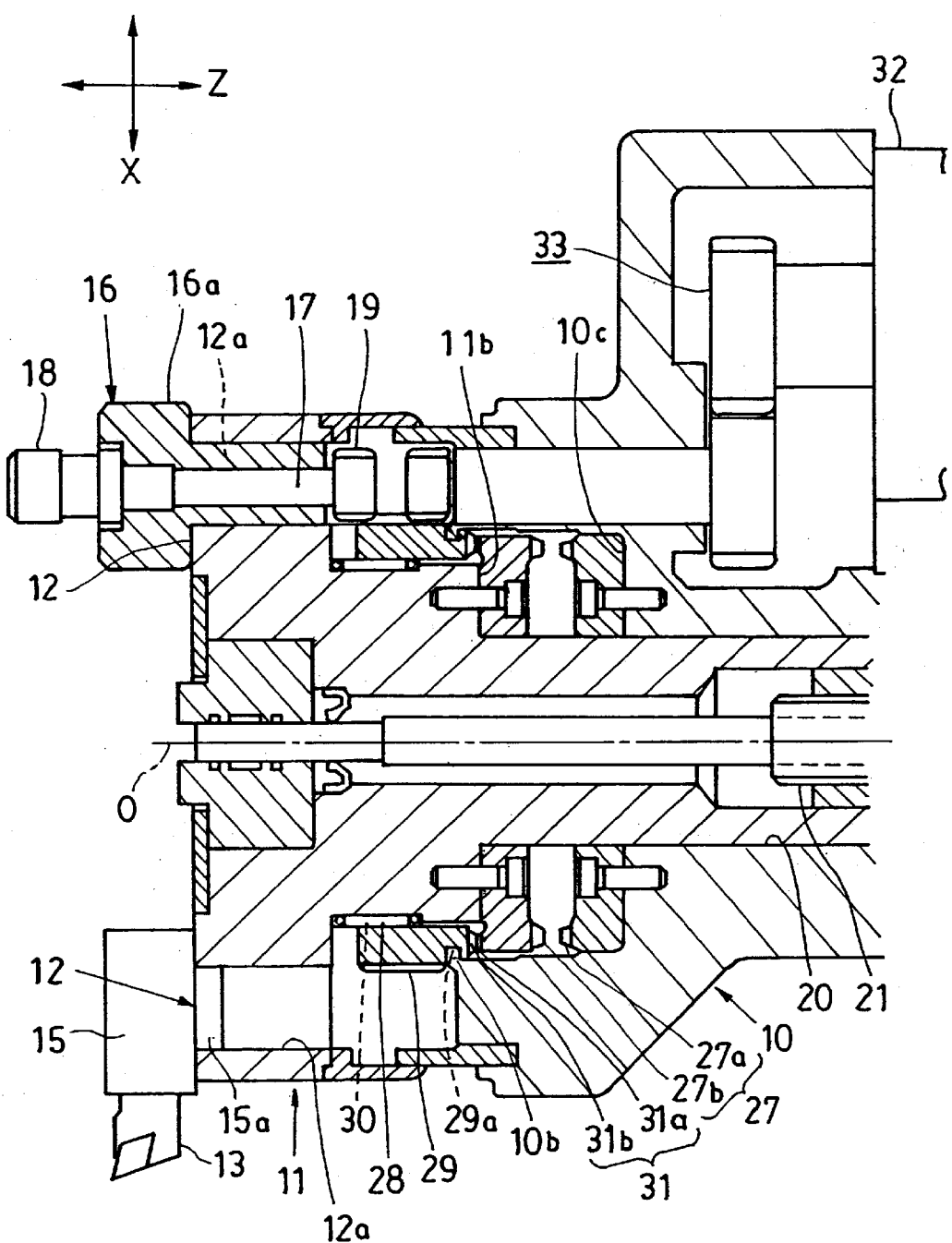
FIG. 4 is an enlarged sectional plan view showing a state wherein the coupling members disengage from each other while the clutch pieces mesh with each other.

Meanwhile, as shown in FIGS. 3 and 4 with enlarged views, the annular gear 29 is structured such that a circumferential groove 29a formed at the rear end thereof is engaged with a protrusion 10b formed on the tool rest main body 10, so that the annular gear 29 is held in a given position by engagement of the circumferential groove 29a with the protrusion 10b.

The hollow part 10a of the tool rest main body 10 has a portion thereof larger in diameter on the tip end side thereof beyond a stepped part 10c, while the turret 11 also has a portion thereof larger in diameter on the tip end side thereof beyond a stepped part 11b. And a coupling member 27 comprising a tool rest main body side coupling 27a and a turret side coupling 27b of a curvic coupling, is provided on the face of the stepped part 10c of the tool rest main body 10 and the stepped part 11b of the turret 11.

Figure 7A:
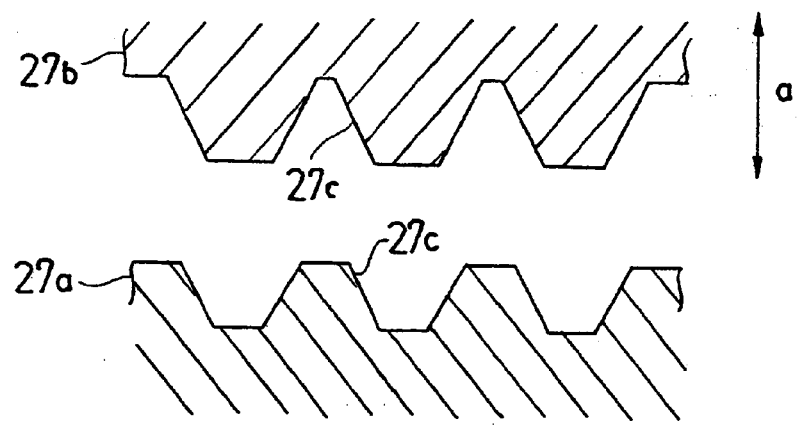
FIG. 7A is an enlarged sectional view showing tooth profiles of the coupling members.
Figure 7B:
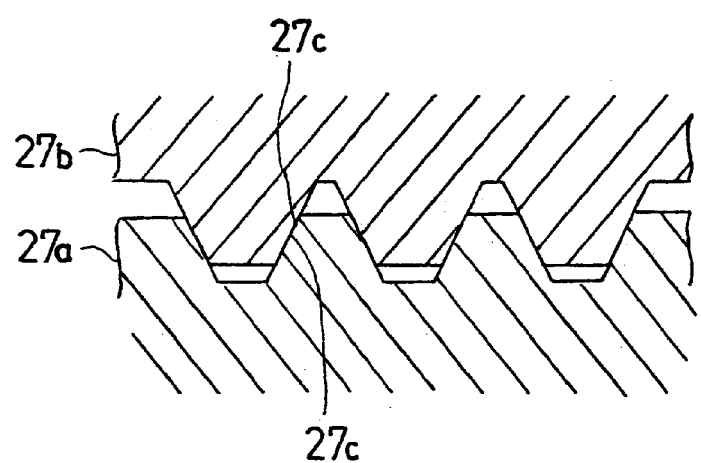
FIG. 7B is also an enlarged sectional view showing the tooth profiles of the coupling members in an engagement state with each other.

The couplings 27a, 27b, each having a tooth profile in a wellknown crown-gear-like shape, function for positioning by meshing respective tooth profiles with each other, and as shown in FIGS. 7A and 7B, the couplings have an inclined tooth profile 27c, formed at given pitches, respectively. And a linear movement of the turret 11 is accompanied by a movement of the turret side coupling 27b fixedly attached to the turret 11, in the direction denoted by "a" in FIG. 7A, so that the tooth profile 27c of the tool rest main body side coupling 27a and the tooth profile 27c of the turret side coupling 27b, opposite to each other, engage with or disengage from each other.

Further, the rear end edge of the annular gear 29 and the front face of the turret side coupling 27b of the coupling member 27 provided on the turret 11 are provided with clutch pieces 31b and 31a, respectively, that are formed so as to oppose each other, thereby making up a clutch member 31. An inclined tooth profile similar to that for the couplings 27a, 27b is formed on the surfaces of the clutch pieces 31a and 31b, opposite to each other, at given pitches. These tooth profiles engage with or disengage from each other as a result of a linear movement of the turret 11, along the rotary center O.

The engagement and disengagement between the clutch pieces 31a, 31b have a reverse relationship to the engagement and disengagement between the couplings 27a, 27b.

That is, when the turret 11 is moved to the right along the z-axis in FIG. 2, relative to the tool rest main body 10, the couplings 27a, 27b engage with each other while the clutch pieces 31a, 31b disengage from each other.

FIG. 3 is an enlarged view showing a state wherein the couplings 27a, 27b, making up the coupling member 27, engage with each other, preventing the rotation of the turret 11, while the clutch pieces 31a, 31b, making up the clutch member 31, disengage from each other.

In the state as shown in the figure, the turret 11 is prevented from rotating by the couplings 27a, 27b engaging with each other, thus precluding indexing rotation. When the turret 11 is moved to the left along the z-axis shown in FIG. 2, relative to the tool rest main body 10, by the turning of the ball screw 21, the couplings 27a, 27b disengage from each other and subsequently, the clutch pieces 31a, 31b engage with each other.

FIG. 4 is an enlarged view showing a state wherein the couplings 27a, 27b disengage from each other while the clutch pieces 31a, 31b engage with each other.

As shown in the figure, the annular gear 29 is in mesh with the tool rotary gear 19 fitted to the tool holder 16 for a rotary tool mounted on one of the tool mounting portions 12 of the turret 11.

Further, an indexing motor 32 comprising a servomotor is mounted on the tool rest main body 10, and the driving force of the indexing motor 32 is transmitted to the annular gear 29 via a gear mechanism 33, thereby rotating the annular gear 29.

Accordingly, in the state shown in FIG. 3, the annular gear 29 is rotated by the indexing motor 32 via the gear mechanism 33, thereby rotating only the tool rotary shaft 17 fitted to the tool holder 16, so that the rotary tool 14 is driven in rotation. On the other hand, in the state shown in FIG. 4, wherein the couplings 27a, 27b disengage from each other and the clutch pieces 31a, 31b engage with each other, the rotation of the annular gear 29 is transmitted to the coupling 27b fixedly attached to the turret 11, so that the indexing motor 32 makes the turret 11 to undergo indexing rotation.

The screw feed mechanism 26 described in the foregoing can be altered such that the nut 25 is disposed on the driving side while the ball screw 21 is disposed on the driven side. In this case, the ball screw 21 is fixedly attached to the turret 11, and caused to move linearly by the rotation of the nut 25 structured so as not to be able to move in the main spindle direction and capable of only rotation, so that the turret 11 structured integrally with the ball screw 21 moves along the rotary center O, thus enabling the screw feed mechanism 26 to have the same function.

Further, in case that low friction and high precision are not required of the screw feed mechanism 26, an ordinary screw may be employed in place of the ball screw 21.

In such a case, it is desirable to install means for restraining the rotation of the turret 11 until immediately before the clutch pieces 31a, 31b mesh with each other (for example, a key or splines that can come off upon the position where engagement of the clutch pieces 31a, 31b occur with each other).

Furthermore, for the coupling member 27 described in the foregoing, a Hirth coupling and so forth with a similar configuration are applicable besides the curvic coupling. Also, positioning means with the use of a friction coupling (brake) having a sufficient braking force or a shot pin may be adopted in place of the couplings 27a, 27b shown in FIGS. 2 etc.

Figure 5:
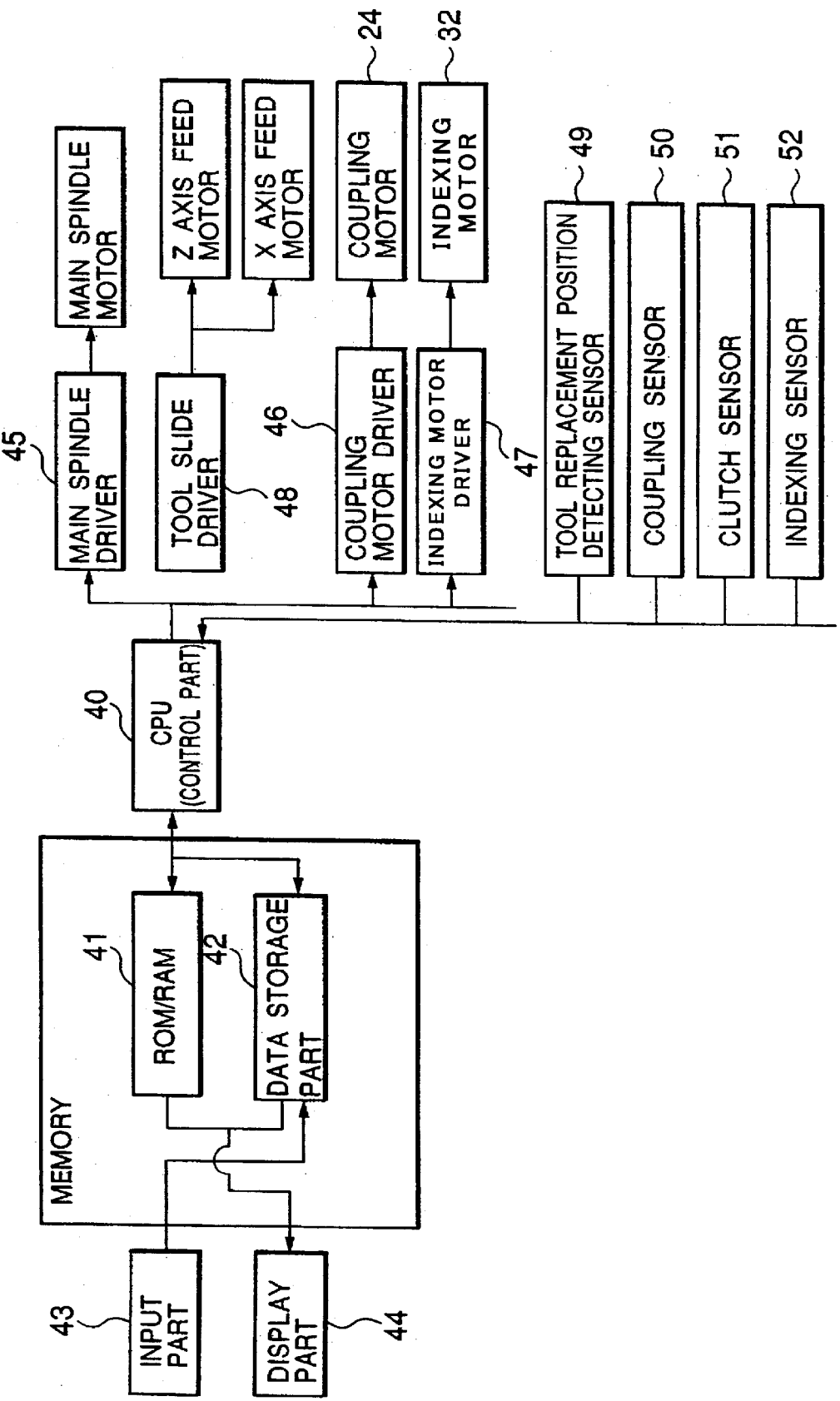
FIG. 5 is a block diagram showing a control system of a tool slide and a turret device.

FIG. 5 is a block diagram showing a control system of the tool slide and the turret device.

As shown in the figure, the control system of the turret device 2 comprises a control part (CPU) 40, a ROM/RAM 41, a data storage part 42, an input part 43, a display part 44, a main spindle driver 45, a coupling motor driver 46, an indexing motor driver 47, a tool slide driver 48, a tool replacement position detecting sensor 49, a coupling sensor 50, a clutch sensor 51, an indexing sensor 52, and so forth.

A control program for driving the turret device 2 is stored in the ROM/RAM 41 beforehand. The control part 40 controls respective components of the tool slide 4 and the turret device 2 according to the control program. The input part 43 comprises a keyboard etc., and data necessary for controlling the respective components of the turret device 2 (selection of tools, a shape and dimensions of a workpiece to be machined, rotating speed of the main spindle, feeding speed of tools, and so forth) are inputted through the input part 43. These data can be inputted in an interactive mode by writing in numerical values on display drawings shown on the display part 44.

The data entered from the input part 43 and various data necessary for driving and controlling the turret device 2 are stored in the data storage part 42.

The control part 40 sends out a predetermined command based on the control program stored in the ROM/RAM 41, and the data for the selection of tools (indexing rotation of the turret) and for machining, stored in the data storage part 42.

The main spindle driver 45 drives a main spindle motor according to a command sent out from the control part 40 to rotate the workpiece clamped by the chuck 3 of the main spindle table 1. The workpiece is machined by the movement of the tool slide 4 in the z-axis direction and the x-axis direction, and also by the rotation of the rotary tool 14 driven by the indexing motor 32 as necessary.

The tool slide driver 48 drives the tool slide 4 in the z-axis and the x-axis directions by driving feed motors for the z-axis and the x-axis directions, respectively, based on a command sent out from the control part 40.

A control system of the tool slide driver 48 functions also as controlling means for eliminating a relative movement between the turret 11 and the main spindle table 1 in synchronization with the coupling motor driver 46.

The coupling motor driver 46 executes engagement and disengagement between the couplings 27a, 27b for positioning and fixedly holding the turret 11 by driving the coupling motor 24 based on a command sent out from the control part 40 while executing engagement and disengagement between the clutch pieces 31a, 31b as well.

The indexing motor driver 47 executes the indexing rotation of the turret 11 or rotative driving of the rotary tool 14 by driving the indexing motor 32 based on a command sent out from the control part 40. In this case, the rotative driving of the rotary tool 14 is executed in machining the workpiece while the indexing rotation of the turret 11 is executed in selecting a tool before or after the workpiece is machined.

The tool replacement position detecting sensor 49 detects whether or not the turret device 2 is in a position suitable for tool replacement (that is, a given backward position of the tool slide 4 where the turret 11 can be indexed, corresponding to the origin point of tools) on the basis of the coordinates for the present position of the tool slide 4.

The coupling sensor 50 monitors the engagement and disengagement between the couplings 27a, 27b, and detects an increase in the rotary torque of the coupling motor 24 upon completion of engaging of the couplings 27a, 27b with each other, sending out a coupling completion signal to the control part 40. The clutch sensor 51 monitors the engagement and disengagement between the clutch pieces 31a, 31b, and similarly sending out a clutch completion signal to the control part 40 when the clutch pieces 31a, 31b engage with each other.

Further, the indexing sensor 52 monitors a rotation angle during the indexing rotation of the turret 11, and sends out an indexing completion signal to the control part 40 upon completion of the indexing rotation up to an angular position according to a command given by the control part 40.

As described above, with this embodiment of the invention, since these sensors designated 49 to 52 are structured so as to be operative by detecting a change in the rotation position or the rotary torque of the servomotor, sensors of a particular type need not be provided.

In the control system shown in FIG. 5, there is shown a configuration wherein a change in the rotation position or the rotary torque of the servomotor is detected by a detection sensor of the tool replacement position detection sensor 49, the coupling sensor 50, the clutch sensor 51 and the indexing sensor 52, respectively, however, an ordinary sensor for detecting a position may evidently be adopted for these sensors. Furthermore, the three sensors other than the indexing sensor 52 may be omitted although it is desirable to keep all the sensors installed when operational safety of the automatic lathe is taken into consideration.

Figure 6:
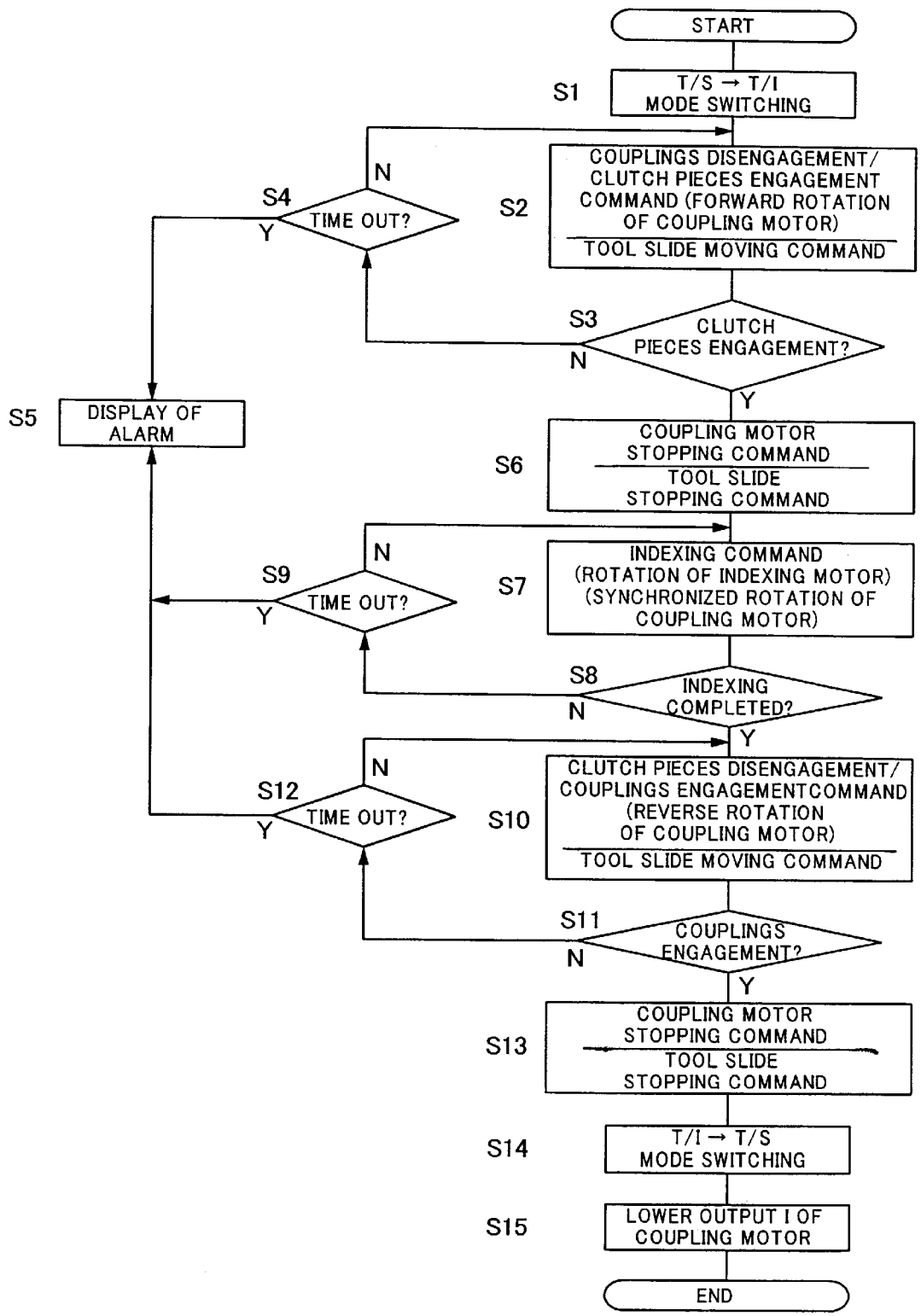
FIG. 6 is a flow chart showing a control operation of the tool slide and the turret device according to the control system shown in FIG. 5.

FIG. 6 is a flow chart showing a control operation for executing the indexing rotation, positioning and fixedly holding of the turret 11 (rotary table), and the rotative driving of the rotary tool 14 by means of the control system configured as described above. Since the control operation is executed mainly by commands sent out from the control part 40, the control operation will be described hereinafter mainly on the basis of commands sent out from the control part 40.

The indexing motor 32 serves as a driving source for executing the indexing rotation of the turret 11 and the rotative driving of the rotary tool 14. Since the rotating speed and the rotating direction of the indexing motor 32 varies depending on an object to be driven thereby, there are provided two modes in which the indexing motor 32 is controlled, that is, a mode for executing the indexing rotation of the turret 11 (T/I mode) and another mode for executing the rotary driving of the rotary tool 14 (T/S mode), and control programs corresponding to the respective modes are stored in the ROM/RAM 41.

First, when executing a step of indexing the turret 11 to select a next tool upon completion of a cutting operation, the control part 40 starts the indexing rotation of the turret 11 after checking up the completion of the cutting operation, and switches the control program of the indexing motor 32 to the T/I mode (S1).

Subsequently, a command for driving is sent out to the coupling motor driver 46, thereby driving the coupling motor 24 in rotation in the forward direction (S2).

In this embodiment of the invention, a rotating direction of the coupling motor 24 for moving the nut 25 of the screw feed mechanism 26 in the forward direction (leftward along the z-axis in FIG. 2) is defined as the forward direction.

When the coupling motor 24 is rotated in the forward direction, the rotative driving force of the coupling motor 24 is transmitted to the ball screw 21 of the screw feed mechanism 26 via the motive transmission gear 23 shown in FIG. 2, thereby turning the ball screw 21. As the ball screw 21 is turned, the nut 25 is urged to make a linear movement forward (leftward along the z-axis) along the rotary center O. Since the turret 11 is fixedly attached to the nut 25, the turret 11 is also urged to move forward (leftward along the z-axis) relative to the tool rest main body 10 together with the nut 25.

If the turret 11 moves forward (leftward along the z-axis) relative to the tool rest main body 10 as above, the turret 11 and a tool (the cutting tool 13 in the case of FIG. 2) make a leftward movement along the z-axis, relative to the main spindle table 1 and the workpiece W, thereby raising the risk of interference.

Hence, the control part 40 drives the feed motor for the z-axis direction by controlling the tool slide driver 48. Such control of the tool slide driver 48 is executed in synchronization with the linear movement of the nut 25 (that is, the leftward movement of the turret 11 along the z-axis relative to the tool rest main body 10) and in such a way as to cause the tool slide 4 to move in the opposite direction (that is, rightward along the z-axis of the turret 11) by a distance covered by the linear movement of the nut 25 (S2).

Upon such a movement of the tool slide 4, the tool rest main body 10 is moved together therewith, and consequently, there will occur no relative movement of the turret 11 in relation to the main spindle table 1 and the workpiece W, thus preventing interference among the respective members described above.

As a result of a leftward relative movement along the z-axis taking place between the turret 11 and the tool rest main body 10, the couplings 27a, 27b of the coupling member 27, installed between the tool rest main body 10 and the turret 11, disengage from each other, rendering the turret 11 freely rotatable.

Hereupon, since a frictional force between the ball screw 21 and the nut 25, making up the screw feed mechanism 26, is sufficiently smaller than that between the base end portion 11a of the turret 11 and the slide bearing 20 of the tool rest main body 10, the turret 11 is caused to move linearly without being rotated.

When the forward rotation of the coupling motor 24 as described in the foregoing is continued, the clutch pieces 31a, 31b of the clutch 31 engage with each other as shown in FIG. 4. Upon completion of the engagement of the clutch pieces 31a, 31b with each other as described above, there will be a rapid increase in the rotary torque of the coupling motor 24, thereby causing the clutch sensor 51 to output a clutch completion signal (S3).

The control part 40 has a timer function for measuring a length of time counted from a time when the driving command driving is sent out to the coupling motor driver 46 (S4), and if the clutch completion signal is not inputted therein even after the elapse of a predetermined length of time, the control part 40 decides it as abnormal state and stops the movement of the turret device 2 and displays an alarm (S5).

On the other hand, if the clutch completion signal is inputted in the control part 40 within the predetermined length of time, the control part 40 stops the rotation of the coupling motor 24, thereby stopping the movement of the turret 11. At the same time, the control part 40 stops the rotation of the feed motor for the z-axis, thereby stopping the movement of the tool slide 4 as well (S6).

Subsequently, the control part 40 sends out a driving command to the indexing motor driver 47 (S7), thereby rotating the indexing motor 32 in a rotating direction and by a rotation angle that are determined by the present tool fixing position and the tool fixing position to be selected next. The rotative driving force of the indexing motor 32 is transmitted to the turret 11 via the gear mechanism 33, the annular gear 29 and the clutch pieces 31a, 31b. The turret 11 is caused to undergo indexing rotation by this rotative driving force up to the tool fixing position to be selected next.

Now, upon the indexing rotation of the turret 11 by the rotative driving force of the indexing motor 32, the nut 25 of the screw feed mechanism 26, fixedly attached to the turret 11, is rotated together with the turret 11. When a relative rotation takes place between the nut 25 and the ball screw 21, the ball screw 21 is urged to make a relative linear movement along the rotary center O by the relative rotation of the nut 25.

However, since the ball screw 21 is restrained from making the linear movement along the rotary center O by the rolling bearings 22, the nut 25 is caused to move, resulting in a movement of the turret 11 along the rotary center O.

When the turret 11 is caused to move rightward by the screw feed mechanism 26, the coupling 27b, while in rotation, interferes with the coupling 27a, thereby disabling the indexing motor 32 to rotate, and when the turret 11 is caused to move leftward, the clutch piece 31a in mesh with the clutch piece 31b is strongly pressed thereto, thereby disabling the indexing motor 32 to rotate.

Hence, with this embodiment of the invention, the coupling motor 24 is designed to be rotated in a given rotating direction at a given ratio of a rotating speed so as not to cause the relative rotation between the nut 25 and the ball screw 21 of the screw feed mechanism 26 in synchronization with the rotation of the indexing motor 32 for indexing the turret 11.

The ratio of the rotating speed and the rotating direction between the coupling motor 24 and the indexing motor 32 are respectively determined by a ratio of a train of gears, a rotating direction of the gears extending from the indexing motor 32 to the annular gear 29 (the turret 11) and those from the coupling motor 24 to the ball screw 21, and therefore, if a control program based on the foregoing is stored in the ROM/RAM 41, this will suffice for the purpose described.

Upon completion of the indexing rotation of the turret 11 as described above, the indexing sensor 52 detects a rotated position of the indexing motor 32, and outputs an indexing completion signal (S8).

Thereupon, the control part 40 measures a length of time elapsed from the time when the driving command is sent out to the indexing motor driver 47 (S9), and decides that the apparatus operates abnormally if the indexing completion signal is not inputted after the elapse of a given length of time, thereby stopping the movement of the turret device 2 and displaying an alarm (S5).

On the other hand, if the indexing completion signal is inputted within the given length of time, the control part 40 stops the rotation of the indexing motor 32, and sends out a driving command to the coupling motor driver 46, thereby rotating the coupling motor 24 in the reverse direction (S10).

Upon reverse rotation of the coupling motor 24, the rotative driving force thereof is transmitted to the ball screw 21 of the screw feed mechanism 26 via the motive transmission gear 23 shown in FIG. 2, causing the ball screw 21 to rotate in reverse direction. Following the reverse rotation of the ball screw 21, the nut 25 and the turret 11 are urged to make relative movement backward (rightward along the z-axis shown in FIG. 2) against the tool rest main body 10.

In this case, the turret 11 and a tool (the cutting tool 13 in the case shown in FIG. 2) make a leftward movement along the z-axis, relative to the main spindle table 1 and the workpiece W, raising also a risk of interference therebetween.

Accordingly, the control part 40 drives the feed motor for the z-axis direction by controlling the tool slide driver 48. Such control of the tool slide driver 48 is executed in synchronization with the linear movement of the nut 25 (that is, the rightward movement of the turret 11 along the z-axis direction, relative to the tool rest main body 10), and in such a way as to cause the tool slide 4 to move in the opposite direction (that is, in the leftward direction along the z-axis of the turret 11) by a distance covered by the linear movement of the nut 25 (S10).

Since such a movement of the tool slide 4 is accompanied by a movement of the tool rest main body 10 made together with the tool slide 4, relative movement of the turret 11 against the main spindle table 1 and the workpiece W can be eliminated, precluding a risk of interference between the respective members described above.

As a result of the relative movement of the turret 11 in the rightward direction along the z-axis against the tool rest main body 10, the clutch pieces 31*a*, 31*b* come to disengage from each other.

When the reverse rotation of the coupling motor 24 is further continued, the couplings 27*a*, 27*b* come to engage with each other as shown in FIG. 3. Upon completion of the engagement of the couplings 27*a*, 27*b* with each other as described, a rapid increase in the rotary torque of the indexing motor 32 occurs, and a coupling completion signal is outputted by the coupling sensor 50 (S11).

The control part 40 measures a length of time elapsed from a time when a driving command for reverse rotation is sent out to the coupling motor driver 46 (S12), and decides that the apparatus operates abnormally if the coupling completion signal is not inputted after the elapse of a given length of time, thereby stopping a movement of the turret device 2 and displaying an alarm (S5).

Meanwhile, if the clutch completion signal is inputted within the given length of time, the control part 40 stops the rotation of the coupling motor 24, thereby stopping the movement of the turret 11. At the same time, the control part 40 stops the rotation of the feed motor for the z-axis, thereby stopping the movement of the tool slide 4 as well (S13).

As a result, selection of a tool is completed.

Subsequently, the control part 40 switches the control mode of the indexing motor 32 to the mode for executing the rotative driving of the rotary tool 14 (T/S mode) (S14) while reducing an output torque of the coupling motor 24 (S15).

The output torque of the coupling motor 24 acts between the couplings 27*a*, 27*b* via the screw feed mechanism 26, and is reduced to a measure of torque just enough to maintain a condition of the couplings 27*a*, 27*b* being in mesh with each other (holding torque).

With this embodiment of the invention, wherein the couplings 27*a*, 27*b* make up the curvic coupling and the linear movement of the turret 11 is executed by means of the screw feed mechanism 26, so the holding torque can be rendered a sufficiently small torque.

A series of steps of operation for tool replacement are completed as described above, and thereafter, cutting operation is executed.

In the control operation described hereinbefore, a step of checking up whether or not the turret device 2 is presently positioned at the origin point of tools (a position where the turret device 2 can be indexed, enabling replacement of tools) based on a detection signal sent out from the tool replacement position detecting sensor 49 may be inserted after the control program of the indexing motor 32 is switched to the T/I mode (that is, after the step S1).

If the turret device 2 is not positioned at the origin point of tools, a command signal for movement to the origin point of tools is sent out to the tool slide driver 48, thereby moving the tool slide 4 of the turret device 2 in the x-axis direction up to the origin point of tools.

By incorporating such an evacuating motion as described above in the control program of the automatic lathe, the interference with obstacles that can not be avoided by the control operation shown in FIG. 6 can be automatically avoided. For example, in case that the control program is switched to the T/I mode while a tool is in contact with the workpiece, such an evasive motion can become effective.

Thus, after checking that the turret device 2 is positioned at the origin point of tools, a driving command is issued to the coupling motor driver 46, thereby driving the coupling motor 24 in rotation in the forward direction.

Further, since the evacuating motion in the x-axis direction as described above is a control motion of the feed motor for the x-axis direction as shown in FIG. 5 while the movement of the tool slide 4 in synchronization with the rotation of the coupling motor 24 is a control motion of the feed motor for the z-axis direction as shown in FIG. 5, these control motions can be executed simultaneously.

Furthermore, it is possible to provide a user with such a way that the evacuating motion in the x-axis direction can be omitted, and if a command giving a directive to that effect is incorporated in the machining program, the evacuating motion in the x-axis direction can be dispensed with.

The embodiments of the invention, described in the foregoing, has shown the configuration wherein the tool slide 4 shown in FIG. 1 is moved in the z-axis direction and the x-axis direction to execute cutting operation, however, a configuration as shown in FIG. 8 may be adopted such that the main spindle table 1 is moved in the z-axis direction on the lathe main body 100 instead of the tool slide 4 being moved in the z-axis direction.

With such a configuration, the main spindle table 1 is moved in the z-axis direction by a driving force of a main spindle table feed motor 60, thereby feeding the workpiece W in the direction of the main spindle axis. The main spindle table feed motor 60 is controlled by a main spindle table feed driver 61. The main spindle table feed motor driver 61 controls the main spindle table feed motor 60 in accordance with a directive from the control part 40 (refer to FIG. 5).

A control system for the main spindle table feed motor 60 also functions as control means for eliminating a relative movement between the turret 11 and the main spindle table 1 in synchronization with the coupling motor driver 46.

More specifically, when the coupling member 27 is engaged or disengaged by movement of the turret 11 in the z-axis direction relative to the tool rest main body 10, prior to the indexing rotation of the turret 11, the main spindle table 1 is caused to move in the direction opposite to the turret 11 along the z-axis for the same distance as that for the movement of the turret 11 in synchronization with the movement of the turret 11.

Such a movement of the main spindle table 1 eliminates a relative movement of the turret 11 against the main spindle table 1 and the workpiece W, thereby preventing interference between the respective members described.

Figure 9:
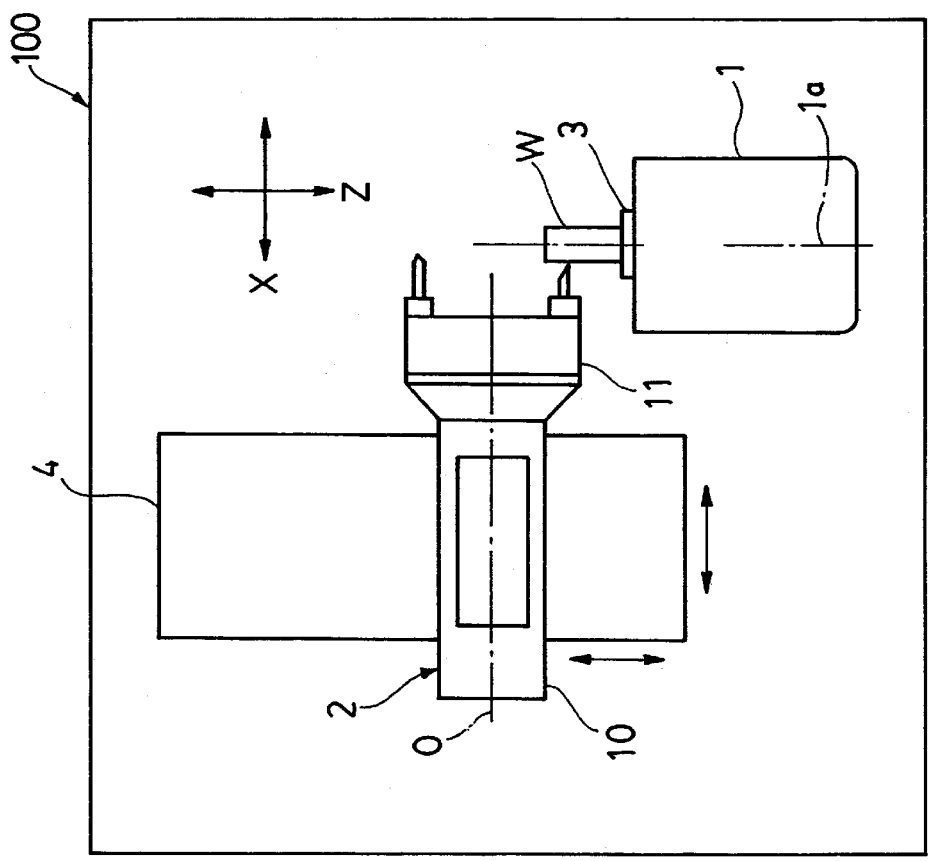
FIG. 9 is a plan view showing an external configuration of an automatic lathe having still another construction to which the invention is applied.

Further, the invention is applicable to an automatic lathe having a configuration as shown in FIG. 9 such that the rotary center O of the ball screw 21 extends in a x-axis direction orthogonal to the main spindle axis.

With this configuration, the turret 11 makes a relative movement in the x-axis direction against the tool rest main body 10 for engaging or disengaging the coupling member 27. Hence, in synchronization with the movement of the turret 11, the tool slide 4 is caused to move in the direction opposite to the turret 11 along the x-axis for the same distance as that for the movement of the turret 11, whereupon the tool rest main body 10 moves together with the tool slide 4.

This movement of the tool rest main body 10 eliminates a relative movement of the turret 11 against the main spindle table 1 and the workpiece W, thereby preventing interference between the respective members described.

INDUSTRIAL APPLICABILITY

By applying the present invention to an automatic lathe structured such that a turret makes a relative movement against a tool rest main body to engage or disengage a coupling member for indexing rotation of the turret, a relative movement of the turret against a main spindle table and a workpiece can be eliminated during the indexing rotation of the turret. As a result, interference of the turret and tools with the main spindle table and the workpiece can be prevented and machining time can be shortened while simplifying programming by a user for machining.

What is claimed is:

1. An automatic lathe comprising:
   a lathe main body with a main spindle table mounted thereon;
   a tool rest main body freely movable on the lathe main body at least in a z-axis direction parallel with a main spindle axis;
   a turret mounted on the tool rest main body, and capable of relatively moving in the z-axis direction against the tool rest main body and indexing around a rotary center parallel to the z-axis;
   a pair of coupling members installed on the tool rest main body and the turret, respectively, and capable of engaging with and disengaging from each other as a result of a relative movement in the z-axis direction taking place between the tool rest main body and the turret; and
   control means for eliminating a relative movement between the turret and the main spindle table by moving the tool rest main body in the z-axis direction relative to the lathe main body, in synchronization with the relative movement in the z-axis direction taking place between the tool rest main body and the turret.

2. An automatic lathe comprising:
   a lathe main body with a tool rest main body mounted thereon;
   a main spindle table movable on the lathe main body at least in a z-axis direction parallel with a main spindle axis;
   a turret mounted on the tool rest main body so as to be freely movable in the z-axis direction and freely indexable around a rotary center parallel to the z-axisrotary center;
   a pair of coupling members installed on the tool rest main body and the turret, respectively, and capable of engaging with and disengaging from each other as a result of a movement of the turret in the z-axis direction; and
   control means for eliminating a relative movement between the turret and the main spindle table by moving the main spindle table in the z-axis direction relative to the lathe main body, in synchronization with the movement of the turret in the z-axis direction.

3. An automatic lathe comprising:
   a lathe main body with a main spindle table mounted thereon;
   a tool rest main body freely movable on the lathe main body at least in an x-axis direction orthogonal to a main spindle axis;
   a turret mounted on the tool rest main body, and capable of relatively moving in the x-axis direction against the tool rest main body and indexing around a rotary center parallel to the z-axis;
   a pair of coupling members installed on the tool rest main body and the turret, respectively, and capable of engaging with and disengaging from each other as a result of a relative movement in the x-axis direction taking place between the tool rest main body and the turret; and
   control means for eliminating a relative movement between the turret and the main spindle table by moving the tool rest main body in the x-axis direction relative to the lathe main body, in synchronization with the relative movement in the x-axis direction taking place between the tool rest main body and the turret.

4. A method of controlling an automatic lathe comprising a lathe main body with a main spindle table mounted thereon, a tool rest main body freely movable on the lathe main body at least in a z-axis direction parallel with a main spindle axis, a turret mounted on the tool rest main body and capable of relatively moving in the z-axis direction against the tool rest main body and indexing around a rotary center parallel to the z-axis, and a pair of coupling members installed on the tool rest main body and the turret, respectively, and capable of engaging with and disengaging from each other as a result of a relative movement in the z-axis direction taking place between the tool rest main body and the turret;
   said method characterized in that a relative movement between the turret and the main spindle table is eliminated by moving the tool rest main body in the z-axis direction, relative to the lathe main body, in synchronization with the relative movement in the z-axis direction taking place between the tool rest main body and the turret.

5. A method of controlling an automatic lathe comprising a lathe main body with a tool rest main body mounted thereon, a main spindle table movable on the lathe main body at least in a z-axis direction parallel with a main spindle axis, a turret mounted on the tool rest main body so as to be freely movable in the z-axis direction and freely indexable around a rotary center parallel to the Z-axis, and a pair of coupling members installed on the tool rest main body and the turret, respectively, and capable of engaging with and disengaging from each other as a result of a movement of the turret in the z-axis direction;
   said method characterized in that a relative movement between the turret and the main spindle table is eliminated by moving the main spindle table in the z-axis direction, relative to the lathe main body, in synchronization with the movement of the turret in the z-axis direction.

6. A method of controlling an automatic lathe comprising a lathe main body with a main spindle table mounted thereon, a tool rest main body freely movable on the lathe main body at least in an x-axis direction orthogonal to a main spindle axis, a turret mounted on the tool rest main body and capable of relatively moving in the x-axis direction against the tool rest main body and indexing around a rotary center parallel to the Z-axis, and a pair of coupling members installed on the tool rest main body and the turret, respectively, and capable of engaging with and disengaging from each other as a result of a relative movement in the x-axis direction taking place between the tool rest main body and the turret;

said method characterized in that a relative movement between the turret and the main spindle table is eliminated by moving the tool rest main body in the x-axis direction relative to the lathe main body, in synchronization with the relative movement in the x-axis direction taking place between the tool rest main body and the turret.

* * * * *